Patented Feb. 20, 1923.

1,446,039

UNITED STATES PATENT OFFICE.

HENRY A. GARDNER, OF WASHINGTON, DISTRICT OF COLUMBIA.

PLASTIC COMPOSITION AND PROCESS OF MAKING SAME.

No Drawing.   Application filed May 26, 1920.   Serial No. 384,261.

*To all whom it may concern:*

Be it known that I, HENRY A. GARDNER, a citizen of the United States, residing at Washington, in the District of Columbia, have invented certain new and useful Improvements in Plastic Compositions and Processes of Making Same, of which the following is a specification.

It is known that unsaturated products having some of the properties of linseed and other drying oils may be prepared from mineral oil or its distillates by a process involving chlorination of the mineral oil and the subsequent elimination of chlorin (compare for example U. S. Patent 1,254,866 to Thiele; British Patent 23,376 of 1914; and U. S. application Serial Number 343,458, patented July 12, 1921, No. 1,384,447 Gardner and Bielouss).

I have discovered that unsaturated products of this general type, hereinafter for convenience briefly designated as "dechlorinated oils", possess particular advantages for use in the plastic arts; and more especially for use in conjunction with rubber, both for the production of molded articles and of so-called rubberized fabrics. These unsaturated bodies, or the products hereinafter described derivable from them by reaction with sulfur or sulfur-containing vulcanizing agents, have been found to yield homogeneous mixtures or solid solutions with rubber: and the resulting vulcanized products are sufficiently tough and wear-resistant to render them of great technical value in the plastic and other arts, including such uses as tire-treads, shoe-soles, aeronautic fabrics, waterproof fabrics in general, etc. etc.

Following are certain illustrative examples in accordance with the invention, it being clearly understood, however, that the invention is not limited to the particular materials, proportions, or manipulations described.

*Example I.*

Raw rubber, or para or other commercial grade, is dissolved (or dispersed) in a suitable liquid such as benzol, a satisfactory composition being prepared by using 1 part by weight of rubber with about 10 parts of benzol. 1000 parts by weight of the resulting composition are mixed with 50 parts, more or less, of a dechlorinated oil (preferably prepared as described in Application Serial No. 343,458 above mentioned), usually with 8 to 30 parts or more of sulfur. Preferably the sulfur is prepared in finely divided form, (for example by the addition of water to sulfur chlorid) and may be preliminarily dissolved in benzol. The resulting fluid composition to which 0.5-1.0% of a suitable organic accelerator of vulcanization may be added if desired, is spread upon fabric, paper or other flexible base, and the latter dried and subjected to the usual hot-vulcanizing operation as ordinarily applied to so-called rubberized fabrics. Laminated products may be built up by consolidating a plurality of such coated or impregnated sheets by pressure.

*Example II.*

Instead of adding sulfur to the composition as described above, the liquid mixture of rubber and dechlorinated oil may be spread on the fabric or other flexible base, and the latter then subjected to so-called "cold curing" as commonly applied to such fabrics, by exposure to vapors of sulfur chlorid.

*Example III.*

For the preparation of a composition applicable for molding purposes I may proceed as follows: 100 parts of raw rubber are kneaded on rubber rolls until thoroughly softened and plasticized, and 5-50 parts of dechlorinated oil, together with 5-30 parts of sulfur are thoroughly incorporated. Suitable fillers or toughening or coloring agents may also be incorporated, as for example zinc oxid, lampblack, barium sulfate or the like, in proportions up to 50% or more of the mass. If desired I may first mix and mill the pigment or other filler and also the sulfur or other vulcanizing agent with the dechlorinated oil to a smooth mass, and add this mass to the rubber on the rolls. Any of the usual organic or inorganic accelerators for the vulcanization may be employed. The composition thus prepared is applicable for general use in the manufacture of molded products, and may be sheeted or formed as desired and then vulcanized: or alternatively it may be vulcanized in sheet or other form and thereafter shaped in any desired way. Higher proportions of sulfur, up to 30% or more by weight of the mass, may be used where harder products are desired.

*Example IV.*

For some purposes where a high degree of elasticity or plasticity is not desired, the rubber may be omitted from compositions such as those mentioned in example III, or used in greatly reduced proportion, the product in such case consisting essentially of a mixture of dechlorinated oil, a vulcanizing agent such as sulfur, or reaction products derived from such mixture, together with a filling material if used. Such products are capable of being molded in the hot press into a wide variety of special articles or products.

I claim:—

1. Process comprising reacting with a sulfur-containing material upon a dechlorinated oil.

2. Process comprising reacting with a sulfur-containing material upon a mixture containing a dechlorinated oil and rubber.

3. A product comprising a reaction product of a dechlorinated oil and sulfur.

4. A product comprising reaction product of a dechlorinated oil, rubber and sulfur.

5. A composition comprising dechlorinated oil, rubber and sulfur.

In testimony whereof, I affix my signature.

HENRY A. GARDNER.